(12) United States Patent
Sato

(10) Patent No.: US 11,261,583 B2
(45) Date of Patent: Mar. 1, 2022

(54) TRAVELING CONTROL MECHANISM AND TRAVELING CONTROL METHOD OF HYDRAULIC DRIVING TYPE CONSTRUCTION MACHINE

(71) Applicant: TAKEUCHI MFG. CO., LTD., Nagano (JP)

(72) Inventor: Tomonori Sato, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 0 days.

(21) Appl. No.: 16/556,366

(22) Filed: Aug. 30, 2019

(65) Prior Publication Data

US 2020/0071911 A1 Mar. 5, 2020

(30) Foreign Application Priority Data

Aug. 31, 2018 (JP) .............................. JP2018-163278
Aug. 29, 2019 (JP) .............................. JP2019-156232

(51) Int. Cl.
*E02F 9/22* (2006.01)
*F16H 61/47* (2010.01)
(Continued)

(52) U.S. Cl.
CPC ............ *E02F 9/2253* (2013.01); *E02F 9/205* (2013.01); *E02F 9/2228* (2013.01);
(Continued)

(58) Field of Classification Search
CPC ....... F16H 61/431; F16H 61/47; E02F 9/2253
See application file for complete search history.

(56) References Cited

U.S. PATENT DOCUMENTS 4,947,687 A * 8/1990 Martini .................. F16H 47/02
477/68
5,678,463 A * 10/1997 Brambilla ............... F16H 47/02
74/731.1
(Continued)

FOREIGN PATENT DOCUMENTS

JP 11-173411 A 6/1999
JP 2005-291259 A 10/2005
(Continued)

OTHER PUBLICATIONS

Communication dated Jan. 28, 2020 from the European Patent Office in application No. 19194619.3.

*Primary Examiner* — Kenneth Bomberg
*Assistant Examiner* — Matthew Wiblin
(74) *Attorney, Agent, or Firm* — Sughrue Mion, PLLC

(57) ABSTRACT

To provide a traveling control mechanism and a traveling control method capable of controlling a traveling mechanism taking into consideration operation contents of a remote control valve. The problem is solved by a traveling control mechanism comprising a remote control valve (21, 22, 23, 24), a pressure adjusting solenoid valve (61, 62), a setting mechanism (70), and a controller (60). The traveling mechanism (8) allows a traveling speed to be switched between a high speed and a low speed in accordance with an operation amount of the remote control valve (21, 22, 23, 24). An HST circuit (30) is provided with a pump (31, 32) and a traveling motor (33), the pump (31, 32) connects to a pilot line (41, 42, 43, 44) allowing a hydraulic oil supplied from the remote control valve (21, 22, 23, 24) to flow therethrough, a pressure sensor (45) is attached to the pilot line (41, 42, 43, 44), and a rotation sensor (65) is attached to the traveling motor (33). The controller (60) controls a pressure of the hydraulic oil supplied from the remote control valve (21, 22, 23, 24) independently of a manual
(Continued)

operation of the remote control valve (21, 22, 23, 24), on the basis of a setting signal, a pressure signal, and a rotation speed signal. The remote control valve (21, 22, 23, 24) controls a flow rate of the hydraulic oil discharged from the pump (31, 32) by changing or keeping constant the pressure inside the pilot line (41, 42, 43, 44).

19 Claims, 7 Drawing Sheets

(51) Int. Cl.
*E02F 9/20* (2006.01)
*F16H 61/4035* (2010.01)
*F15B 11/16* (2006.01)
*F15B 11/044* (2006.01)
*F15B 7/00* (2006.01)
*F16H 61/42* (2010.01)

(52) U.S. Cl.
CPC ............ *E02F 9/2285* (2013.01); *F15B 7/008* (2013.01); *F15B 11/0445* (2013.01); *F15B 11/165* (2013.01); *F16H 61/4035* (2013.01); *F16H 61/47* (2013.01); *E02F 9/2292* (2013.01); *E02F 9/2296* (2013.01); *F15B 2211/555* (2013.01); *F16H 61/42* (2013.01)

(56) References Cited

U.S. PATENT DOCUMENTS

| | | | |
|---|---|---|---|
| 2011/0295473 A1* | 12/2011 | DeMarco | F16H 61/472 |
| | | | 701/58 |
| 2013/0036729 A1* | 2/2013 | Kinugawa | F16H 61/468 |
| | | | 60/446 |
| 2014/0144129 A1* | 5/2014 | Shirao | F16H 61/438 |
| | | | 60/327 |
| 2014/0290236 A1* | 10/2014 | Aizawa | F16H 39/02 |
| | | | 60/443 |
| 2016/0341308 A1 | 11/2016 | Rathke | |
| 2017/0241448 A1* | 8/2017 | Kondo | F16H 59/36 |
| 2017/0306590 A1* | 10/2017 | Kondo | F16H 61/431 |
| 2019/0101138 A1* | 4/2019 | Fukuda | F15B 13/029 |
| 2019/0170246 A1* | 6/2019 | Gambetti | F16H 61/431 |

FOREIGN PATENT DOCUMENTS

| | | |
|---|---|---|
| JP | 2013-204783 A | 10/2013 |
| JP | 2017-145960 A | 8/2017 |

* cited by examiner

TRAVELING CONTROL MECHANISM AND TRAVELING CONTROL METHOD OF HYDRAULIC DRIVING TYPE CONSTRUCTION MACHINE

TECHNICAL FIELD

The present invention relates to a traveling control mechanism and a traveling control method of a hydraulic driving type construction machine, and more specifically relates to a traveling control mechanism and a traveling control method of a hydraulic driving type construction machine that uses a hydro static transmission (HST) circuit as a traveling circuit.

BACKGROUND ART

Among hydraulic driving type construction machines and hydraulic driving type work machines (hereinafter referred to as "construction machine or the like"), there are machines that use a hydro static transmission (HST) circuit as a hydraulic circuit for making a construction machine or the like travel. A construction machine or the like that uses an HST circuit controls a traveling form of the construction machine or the like, such as a traveling speed, in accordance with operation conditions.

For example, a method of load-dependent adjustment of a hydraulic drive proposed in Patent Document 1 is a method for ensuring optimum control of the synchronization of two hydraulic motors, and adjusting the hydraulic motors, which power a hydraulic driving mechanism, in accordance with a predetermined operation. Specifically, when a load of a hydraulic motor increases, the hydraulic motor is controlled so that the torque thereof does not drop. That is, the control form of Patent Document 1 is performed using only the hydraulic circuit of a traveling system.

On the other hand, a construction machine is controlled by an operator operating a remote control valve in an operator cabin. A traveling mechanism is also controlled by operation of the remote control valve. Thus, when predetermined control is to be performed on the traveling mechanism, operation of the remote control valve needs to be considered. In this case, the remote control valve may need to be controlled independently of a manual operation thereof.

PATENT DOCUMENTS

Patent Document 1: Publication of U.S. Patent Application No. 2016-0341308

DISCLOSURE OF THE INVENTION

Problems to be Solved by the Invention

Nevertheless, the control form proposed in Patent Document 1 is performed using only the hydraulic circuit of the traveling system without taking into consideration the operation of the remote control valve. Thus, the traveling form of the construction machine corresponding to the operation of the remote control valve cannot be identified, and thus only limited control, that is, control for ensuring that the torque of the hydraulic motor does not drop when the load of a hydraulic motor increases, can be performed.

The present invention is made to solve the above-described problems, and an object of the present invention is to provide a traveling control mechanism and a traveling control method capable of controlling a traveling mechanism taking into consideration operation contents of a remote control valve.

Means for Solving the Problems (1) A traveling control mechanism according to the present invention for solving the above-described problems controls a traveling mechanism configured by an HST circuit and provided to each of a left and a right of a construction machine, the traveling control mechanism comprising a remote control valve that controls an operation of the construction machine, a pressure adjusting solenoid valve that adjusts a primary pressure of a hydraulic oil supplied to the remote control valve, a setting mechanism for executing a fixed setting to make the construction machine perform a desired operation, and a controller for controlling the traveling mechanism. The traveling mechanism is configured to be capable of switching a traveling speed of the construction machine between a high speed and a low speed slower than the high speed, in accordance with an operation amount of the remote control valve. The HST circuit is provided with a pump and a traveling motor. The pump connects to pilot lines extending from the remote control valve and allowing the hydraulic oil supplied from the remote control valve to flow therethrough. The pilot lines are each provided with a pressure sensor that measures a pressure of the hydraulic oil flowing through the pilot line. The traveling motor is provided with a rotation sensor that measures a rotation speed of the traveling motor. The controller activates the remote control valve independently of a manual operation thereof so as to adjust the pressure of the hydraulic oil supplied from the remote control valve on the basis of a setting signal from the setting mechanism, a pressure signal from the pressure sensor, and a rotation speed signal from the rotation sensor. The remote control valve adjusts a flow rate of the hydraulic oil discharged from the pump by changing or keeping constant the pressure of the hydraulic oil that flows through the pilot lines.

According to this invention, the pilot lines are each provided with a pressure sensor that measures the pressure of the hydraulic oil flowing through the pilot line, making it possible to identify operation contents of the remote control valve connected to the pilot line. Further, the traveling control mechanism is provided with a pressure adjusting solenoid valve that adjusts a primary pressure of the hydraulic oil supplied to the remote control valve, making it possible to adjust a secondary pressure of the hydraulic oil supplied from the remote control valve to a pressure corresponding to the primary pressure. Thus, it is possible to perform control independently of and different from the operation contents of the remote control valve while identifying the operation contents. Further, the traveling motor is provided with the rotation sensor that measures the rotation speed of the traveling motor, making it possible to perform control so that the controller outputs a current value appropriate for the pressure adjusting solenoid valve by feedback of the rotation speed signal sent from the rotation sensor to the controller.

In the traveling control mechanism according to the present invention, the controller judges whether the remote control valve performed an operation for moving one of the left and right traveling mechanisms forward or backward, or one of the left and right traveling mechanisms forward and the other backward, on the basis of a pressure signal from the pressure sensor, and is activated so as to change the current value supplied to the pressure adjusting solenoid valve, determine the primary pressure of the hydraulic oil supplied to the operated remote control valve, and adjust the secondary pressure of the hydraulic oil supplied from the remote control valve to a pressure corresponding to the primary pressure to supply hydraulic oil to the pump. The pump is activated so that the flow rate of the hydraulic oil discharged from the pump is kept constant in accordance with the secondary pressure, thereby switching the traveling speed of one or both of the left and right traveling mechanisms corresponding to the operated remote control valve from high speed to low speed.

According to this invention, when the construction machine makes a pivot turn or a spin turn, it is possible to perform control for switching the speed of one or both of the left and right traveling mechanisms to low speed independently of the contents of the manual operation of the remote control valve. Thus, even when the operator operates the remote control valve so that a pivot turn or a spin turn is made at high speed, it is possible to switch the speed of one or both of the traveling mechanisms to low speed to safely turn the construction machine.

In the traveling control mechanism according to the present invention, the setting mechanism is configured so that the traveling speed of the construction machine can be set to creep mode where the traveling speed of the construction machine is slower than the low speed. The controller compares the traveling speed of the construction machine calculated on the basis of the rotation speed signal and the set speed in creep mode set by the setting mechanism and, when the traveling speed exceeds the set speed, is activated so as to change the current value supplied to the pressure adjusting solenoid valve, determine the primary pressure of the hydraulic oil supplied to the remote control valve, and adjust the secondary pressure of the hydraulic oil supplied from the remote control valve to a pressure corresponding to the primary pressure to supply the hydraulic oil to the pump. The pump is activated so that the flow rate of the hydraulic oil discharged from the pump is kept constant in accordance with the secondary pressure, thereby making the construction machine travel at the set speed in creep mode set by the setting mechanism.

According to this invention, the traveling control mechanism is configured as described above, making it possible to perform control so that the construction machine travels at the speed set in creep mode, regardless of the operation contents of the remote control valve. Thus, it is possible to make the construction machine travel at a very slow speed.

In the traveling control mechanism according to the present invention, regardless of whether an operation of the remote control valve is a form for making the construction machine travel at the high speed, when the controller judges that the construction machine is traveling at the low speed on the basis of the rotation speed signal, the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to a pressure corresponding to the primary pressure to supply the hydraulic oil to the pump, and the pump is activated so that the flow rate of the hydraulic oil discharged from the pump is decreased in accordance with the secondary pressure, thereby switching the traveling speed of the construction machine to the low speed.

According to this invention, the traveling control mechanism is configured as described above and thus, when the construction machine is traveling at high speed, the traveling speed of the construction machine can be switched to low speed independently of the manual operation contents of the remote control valve, even when a load is applied. This ensures that an overload is not applied to the traveling mechanism, making it possible for the construction machine to travel uphill and the like. Further, when the rotation speeds of the left and right traveling motors are detected as different in creep mode where the traveling speed of the construction machine is even slower than low speed, the pressure adjusting solenoid valve is controlled to make the rotation speeds of the left and right traveling motors identical and maintain this state, thereby improving an automatic straight traveling function of the construction machine.

In the traveling control mechanism according to the present invention, when changing from a form where the rotation speed of the traveling motor of the construction machine is low and an engine torque is large to a form where the rotation speed of the traveling motor is high and the engine torque is small, the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to a pressure corresponding to the primary pressure to supply the hydraulic oil to the pump, and the pump is activated so as to increase the flow rate of the hydraulic oil discharged from the pump in accordance with the secondary pressure, thereby automatically switching the traveling speed of the construction machine from the low speed to the high speed.

According to this invention, when the construction machine changes from a form where the rotation speed of the traveling motor is low and the engine torque is large to a form where the rotation speed of the traveling motor is high and the engine torque is small, the traveling speed of the construction machine can be automatically switched from low speed to high speed by supplying a flow rate of the hydraulic oil that matches the traveling form of the construction machine to the HST circuit.

In the traveling control mechanism according to the present invention, when operation of the remote control valve is set to full lever and a pressure signal from a pressure sensor detects pressure equivalent to full lever, the traveling speed is automatically switched from high speed to low speed when less than or equal to a set value, and from low speed to high speed when greater than or equal to a set value.

According to this invention, it is possible to control the traveling mechanism by a speed change when the remote control valve is set to full lever and the pressure sensor detects a pressure equivalent to full lever.

(2) A traveling control method of a construction machine according to the present invention for solving the above-described problems is a method for controlling a traveling mechanism configured by an HST circuit and provided to each of a left and a right of a construction machine, the traveling control method comprising the steps of providing a remote control valve that controls an operation of the construction machine, a pressure adjusting solenoid valve that adjusts a primary pressure of a hydraulic oil supplied to the remote control valve, a setting mechanism for executing a fixed setting to make the construction machine perform a desired operation, and a controller for controlling the traveling mechanism to the traveling control mechanism; configuring the traveling mechanism to be capable of switching a traveling speed of the construction machine between a high speed and a low speed slower than the high speed, in accordance with an operation amount of the remote control valve; providing a pump and a traveling motor to the HST circuit; connecting pilot lines extending from the remote control valve and allowing the hydraulic oil supplied from the remote control valve to flow therethrough to the pump; attaching to each of the pilot lines a pressure sensor that measures a pressure of the hydraulic oil flowing through the pilot line; attaching to the traveling motor a rotation sensor that measures a rotation speed of the traveling motor; controlling the remote control valve independently of a manual operation thereof by the controller so as to adjust the pressure of the hydraulic oil supplied from the remote control valve on the basis of a setting signal from the setting mechanism, a pressure signal from the pressure sensor, and a rotation speed signal from the rotation sensor; and adjusting a flow rate of the hydraulic oil discharged from the pump by the remote control valve by changing or keeping constant the pressure of the hydraulic oil that flows through the pilot lines.

According to this invention, the operation contents of the remote control valve connected to the pilot lines can be identified. Further, the secondary pressure of the hydraulic oil supplied from the remote control valve can be adjusted to a pressure corresponding to the primary pressure. Thus, it is possible to perform control independently of and different from the operation contents of the remote control valve while identifying the operation contents. Further, it is possible to perform control so that the controller outputs a current value appropriate for the pressure adjusting solenoid valve by feedback of the rotation speed signal sent from the rotation sensor to the controller.

Advantages of the Invention

According to the present invention, it is possible to provide a traveling control mechanism and a traveling control method capable of controlling a traveling mechanism, taking into consideration operation contents of a remote control valve.

BEST MODE FOR CARRYING OUT THE INVENTION

Figure 1:
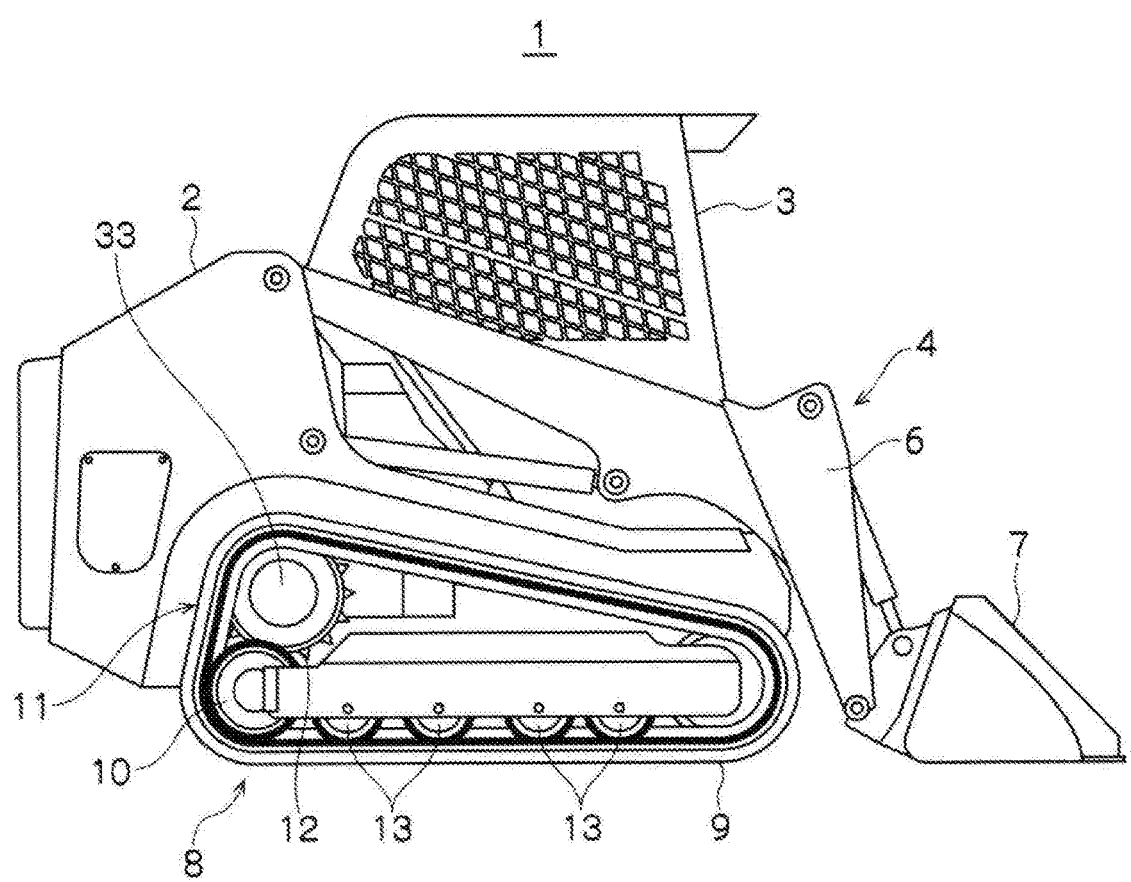
FIG. 1 is a side view illustrating an example of a construction machine to which the present invention is applied.

Below, embodiments of the present invention will be described with reference to the drawings. The present invention includes inventions of the same technical concept as in embodiments described below and forms illustrated in the drawings, and the technical scope of the present invention is not limited to only the descriptions of the embodiments and the drawings.

[Construction Machine to which Invention is Applied]

Examples of a construction machine 1 to which the present invention is applied include a hydraulic shovel, a hydraulic track loader, a hydraulic carrier, and the like. Further, examples of a traveling mechanism 8 of these construction machines 1 include both a crawler type and a wheel type. An overview of the configuration of the construction machine 1 is given below using a configuration of a crawler-type hydraulic track loader as an example, with reference to FIG. 1.

FIG. 1 is a side view illustrating an example of a hydraulic track loader. The hydraulic track loader is mainly configured by a main frame 2, an operator cabin 3, a work mechanism 4, and the traveling mechanism 8.

The main frame 2 is a component on which various driving constituents, such as an engine and a hydraulic device of the hydraulic track loader, are incorporated, and supports the operator cabin 3 and the work mechanism 4. The operator cabin 3 is a constituent in which an operator who operates the construction machine 1 sits. The work mechanism 4 is mainly configured by an arm 6 and a bucket 7, and is a constituent for placing soil and the like into a bucket 7 and transporting these, or pushing these forward. The traveling mechanism 8 is configured by a crawler 9 and a driving mechanism 11 that rotationally drives the crawler 9, and is a constituent for making the construction machine 1 travel and turn. The driving mechanism 11 is configured by a traveling motor 33, a sprocket 12 for driving, a plurality of track rollers 10, 13, and the like. It should be noted that the sprocket 12 is integrally configured with the traveling motor 33.

[Basic Configuration of Invention]

Figure 2:
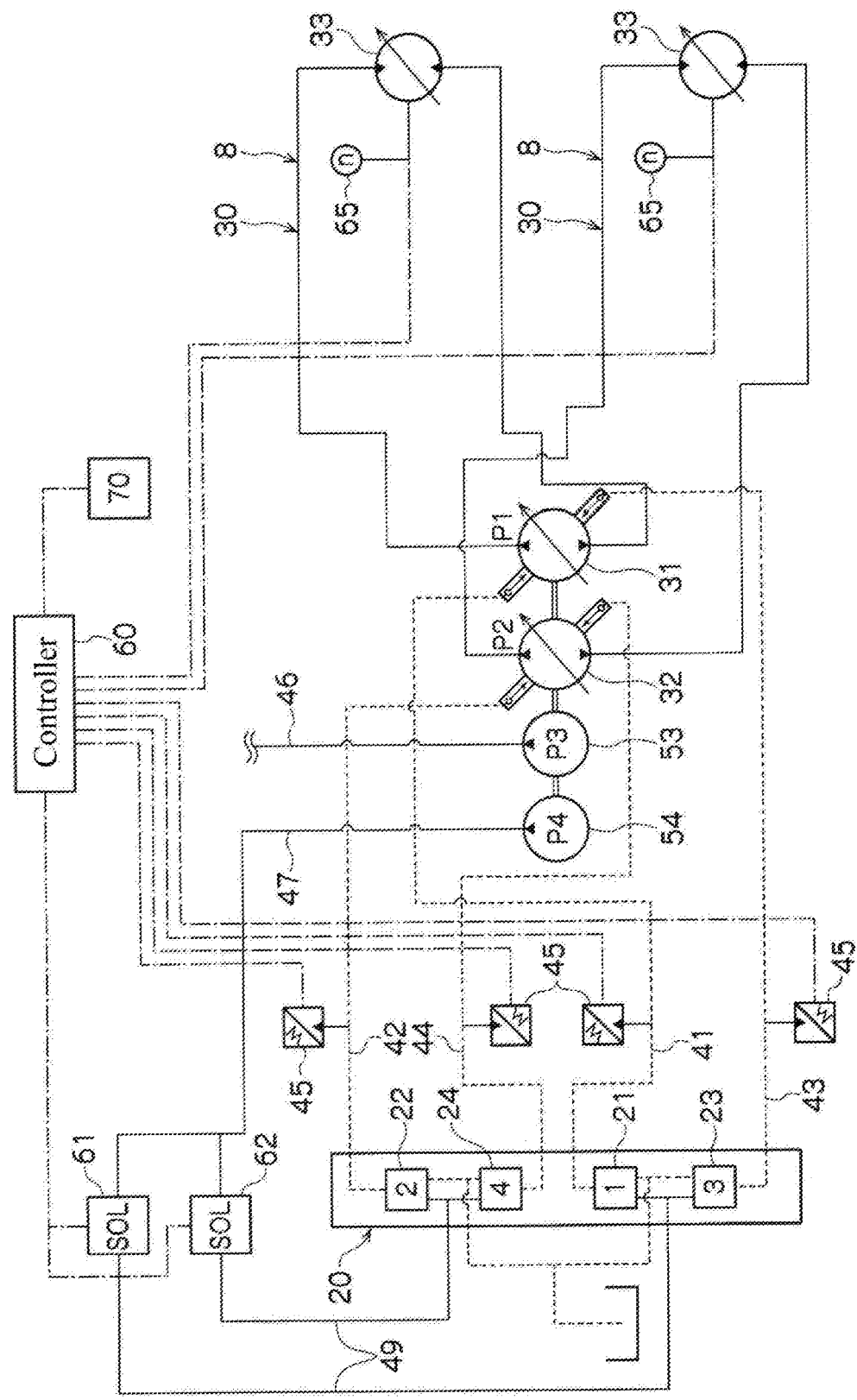
FIG. 2 is a schematic drawing of a system for implementing the present invention.

A traveling control mechanism according to the present invention is a mechanism that controls the traveling mechanism 8 configured by an HST circuit 30 and provided to each of a left and a right of the construction machine 1, as illustrated in FIG. 2. The traveling control mechanism comprises remote control valves 21, 22, 23, 24, pressure adjusting solenoid valves 61, 62, a setting mechanism 70, and a controller 60. The remote control valves 21, 22, 23, 24 control an operation of the construction machine 1. The pressure adjusting solenoid valves 61, 62 adjust a primary pressure of a hydraulic oil supplied to the remote control valves 21, 22, 23, 24. The setting mechanism 70 allows a fixed setting in order to make the construction machine 1 perform a desired operation. The controller 60 controls the overall operation of the construction machine 1 including the traveling mechanisms 8. The traveling mechanism 8 is configured to be capable of switching a traveling speed of the construction machine 1 between a high speed and a low speed slower than the high speed, in accordance with an operation amount of the remote control valves 21, 22, 23, 24. The HST circuit 30 is provided with pumps 31, 32 and the traveling motor 33. The pumps 31, 32 is configured by the P1 pump 31 and the P2 pump 32. The P1 pump 31 and the P2 pump 32 connect to pilot lines 41, 42, 43, 44 extending from the remote control valves 21, 22, 23, 24 and allowing the hydraulic oil supplied from the remote control valves 21, 22, 23, 24 to flow therethrough. The pilot lines 41, 42, 43, 44 are each provided with a pressure sensor 45 that measures a pressure of the hydraulic oil flowing through the pilot lines 41, 42, 43, 44, and the traveling motor 33 is provided with a rotation sensor 65 that measures a rotation speed of the traveling motor 33.

The controller 60 controls the pressure adjusting solenoid valves 61, 62 on the basis of a setting signal from the setting mechanism 70, pressure signals from the pressure sensors 45, and a rotation speed signal from the rotation sensor 65, adjusts a secondary pressure of the hydraulic oil supplied from the remote control valves 21, 22, 23, 24, and activates the remote control valves 21, 22, 23, 24 independently of a manual operation of the remote control valves 21, 22, 23, 24. Then, the remote control valves 21, 22, 23, 24 adjust a flow rate of the hydraulic oil discharged from the P1 pump 31 and the P2 pump 32 by changing or keeping constant the pressure of the hydraulic oil that flows through the pilot lines 41, 42, 43, 44.

A traveling control method of the construction machine 1 according to the present invention is a method for controlling the flow rate of the hydraulic oil discharged from the pumps 31, 32 using the traveling control mechanism configured as described above.

According to the present invention, it is possible to provide a traveling control mechanism and a traveling control method capable of controlling the traveling mechanism 8, taking into consideration operation contents of the remote control valves 21, 22, 23, 24.

[Overview of System for Implementing Invention]

FIG. 2 shows an overview of a system for implementing the present invention. This system is configured by a hydraulic system and a control system. In FIG. 2, the lines illustrated by a solid line and a broken line indicate the hydraulic system, and the lines illustrated by a dashed line indicate the control system. The hydraulic system comprises the HST circuit 30, the pilot lines 41, 42, 43, 44, the remote control valves 21, 22, 23, 24, and the pressure adjusting solenoid valves 61, 62. Further, the hydraulic system comprises a P3 pump 53 and a P4 pump 54. On the other hand, the control system includes the controller 60. The controller 60 receives output from the hydraulic system, performs fixed processing, and then sends commands to the pressure adjusting solenoid valves 61, 62.

<Hydraulic System>

(Hst Circuit)

The HST circuit 30 is a hydraulic circuit constituting the traveling mechanism 8 of the construction machine 1. FIG. 2 shows a simplified model of the HST circuit 30 for simply explaining the invention. The HST circuit 30 is mainly configured by the P1 pump 31, the P2 pump 32, two of the traveling motors 33, and hydraulic hoses and pipes communicating the P1 pump 31 and the P2 pump 32 and the respective traveling motors 33. The HST circuit 30 is provided to each of the traveling mechanisms 8 on both the left and right sides of the construction machine 1.

The P1 pump 31 and the P2 pump 32 are piston pumps, and are configured to be capable of changing the flow rate of the discharged hydraulic oil by changing an inclination angle of an inclined plate inside the pump. Specifically, the inclination angle of the inclined plate inside the pump is changed by changing the pressure of the hydraulic oil supplied from the pilot lines 41, 42, 43, 44 described later.

The traveling motor 33 is a constituent that rotates by the supply of hydraulic oil discharged from the P1 pump 31 and the P2 pump 32. The traveling motor 33 is, for example, connected to the sprocket 12 for driving constituting the traveling mechanism 8 at a rotating shaft, and rotationally drives the crawler 9 by rotating the sprocket 12 for driving, thereby making the construction machine 1 travel. The rotation speed of the traveling motor 33 is set by the flow rate of the hydraulic oil fed from the P1 pump 31 and the P2 pump 32. That is, when the flow rate of the hydraulic oil fed from the P1 pump 31 and the P2 pump 32 is relatively low, the rotation speed of the traveling motor 33 is relatively slow, and when the flow rate of the hydraulic oil fed from the P1 pump 31 and P2 pump 32 is relatively high, the rotation speed of the traveling motor 33 is relatively fast. Further, a mechanism that adjusts the flow rate of the hydraulic oil introduced into the traveling motor 33 is provided to the traveling motor 33 itself. Such traveling motors 33 are each provided with the rotation sensor 65 that measures a rotation speed of the traveling motor 33.

(P3 Line)

A P3 line 46 is a hydraulic line connected to the P3 pump 53 illustrated in FIG. 2. The P3 line 46, while not particularly illustrated in the drawing, supplies hydraulic oil to a control valve that controls the work mechanism 4 configured by a boom 5 and the like.

(P4 Line)

A P4 line 47 is a hydraulic line connected to the P4 pump 54 illustrated in FIG. 2. The P4 line 47, while not particularly illustrated in the drawing, branches from the pilot line 47, introduces hydraulic oil into the traveling motors 33, turns the parking brake on and off, and switches between high speed and low speed. Further, the P4 line 47 is connected to the pressure adjusting solenoid valves 61, 62, as illustrated in FIG. 2. The pressure adjusting solenoid valves 61, 62, as described later, are connected to a remote control valve unit 20 by a primary pilot line 49. This primary pilot line 49 supplies hydraulic oil to the four remote control valves 21, 22, 23, 24 constituting the remote control valve unit 20.

Specifically, as illustrated in FIG. 2, the two pressure adjusting solenoid valves 61, 62 are provided. The first pressure adjusting solenoid valve 61 communicates with the first remote control valve 21 and the third remote control valve 23 of the four remote control valves 21, 22, 23, 24 constituting the remote control valve unit 20. Further, the second pressure adjusting solenoid valve 62 communicates with the second remote control valve 22 and the fourth remote control valve 24.

(Pilot Line)

The pilot lines 41, 42, 43, 44 are hydraulic lines that control the flow rate of the hydraulic oil discharged from the P1 pump 31 and the P2 pump 32. That is, the pilot lines 41, 42, 43, 44 constitute the secondary pilot line. However, here, the secondary pilot line is described as the "pilot lines 41, 42, 43, 44."

The pilot lines 41, 42, 43, 44 communicate the remote control valves 21, 22, 23, 24 described later and the P1 pump 31 and the P2 pump 32. The pressure of the hydraulic oil flowing through the pilot lines 41, 42, 43, 44 is changed by operation of the remote control valves 21, 22, 23, 24. Two of the pilot lines 41, 42, 43, 44 are respectively provided to the P1 pump 31 and the P2 pump 32, as illustrated in FIG. 2. Specifically, the P1 pump 31 communicates with the first remote control valve 21 and the third remote control valve 23 by the pilot lines 41, 43, and the P2 pump 32 communicates with the second remote control valve 22 and the fourth remote control valve 24 by the pilot lines 42, 44.

These pilot lines 41, 42, 43, 44 are each provided with the pressure sensor 45 that measures a pressure of the hydraulic oil flowing through the pilot lines 41, 42, 43, 44.

(Remote Control Valve)

The remote control valve unit 20 illustrated in FIG. 2 is configured by the four remote control valves 21, 22, 23, 24 and the four remote control valves 21, 22, 23, 24 constitute the one remote control valve unit 20. The remote control valves 21, 22, 23, 24 are manually operated using a joystick (not illustrated) by the operator. The remote control valves 21, 22, 23, 24 supply hydraulic oil to the pilot lines 41, 42, 43, 44 in accordance with the manual operation. Specifically, the first remote control valve 21 and the third remote control valve 23 control the flow rate of the hydraulic oil discharged by the P1 pump 31 by supplying the hydraulic oil from the first pressure adjusting solenoid valve 61 to the P1 pump 31 in accordance with a manual operation of the joystick by the operator. On the other hand, the second remote control valve 22 and the fourth remote control valve 24 control the flow rate of the hydraulic oil discharged by the P2 pump 32 by supplying the hydraulic oil from the second pressure adjusting solenoid valve 62 to the P2 pump 32 in accordance with a manual operation of the joystick by the operator.

Such four remote control valves 21, 22, 23, 24 are configured to be activated independently of the manual operation of the remote control valves 21, 22, 23, 24 so as to adjust the pressure of the hydraulic oil supplied from the remote control valves 21, 22, 23, 24 on the basis of the command of the controller 60 described later.

Figure 7:
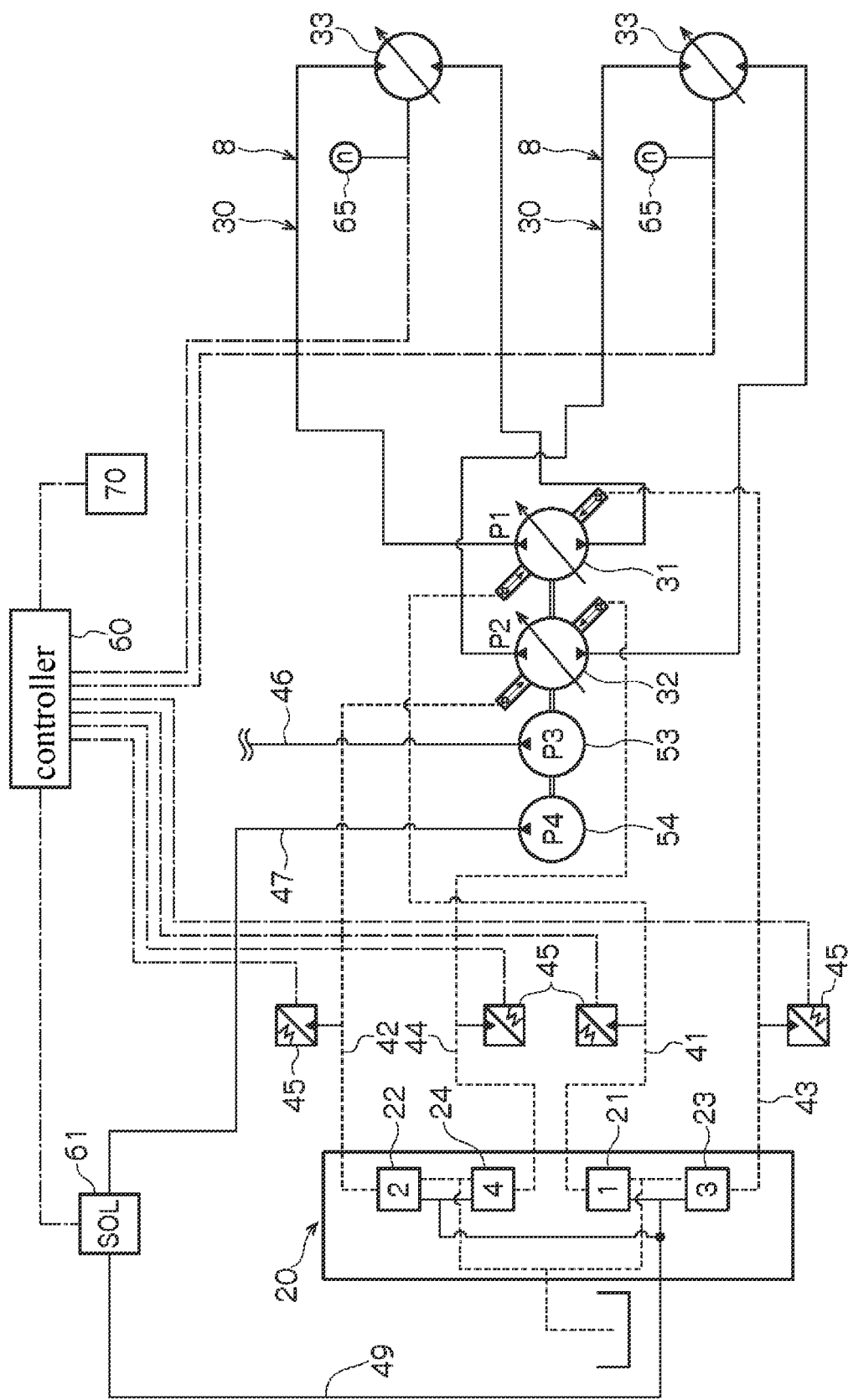
FIG. 7 is a schematic drawing of a system provided with one solenoid valve.

It should be noted that, as illustrated in the system schematic drawing in FIG. 7, the system may be provided with the one pressure adjusting solenoid valve 61. In this mode, the one pressure adjusting solenoid valve 61 is connected to the remote control valve unit 20 by the pilot line 49. The pilot line 49 supplies hydraulic oil to the four remote control valves 21, 22, 23, 24 constituting the remote control valve unit 20. Specifically, in the first remote control valve 21 and the third remote control valve 23, the hydraulic oil is supplied from the pressure adjusting solenoid valve 61, and the flow rate of the hydraulic oil discharged by the P1 pump 31 is controlled by supplying the hydraulic oil to the P1 pump 31 in accordance with a manual operation of the joystick by the operator. On the other hand, in the second remote control valve 22 and the fourth remote control valve 24 as well, the hydraulic oil is supplied from the same pressure adjusting solenoid valve 61, and the flow rate of the hydraulic oil discharged by the P2 pump 32 is controlled by supplying the hydraulic oil to the P2 pump 32 in accordance with a manual operation of the joystick by the operator. It should be noted that all other components are the same as those in the system schematic drawing illustrated in FIG. 2.

<Control System>

According to the present invention, the controller 60, the pressure sensors 45, the rotation sensor 65, and the setting mechanism 70 are used as the control system. The controller 60 is, for example, provided in an interior of the main frame 2, and controls the overall operation of the construction machine 1.

The pressure sensor 45 is attached to each of the pilot lines 41, 42, 43, 44 communicating the remote control valves 21, 22, 23, 24 and the P1 pump 31 and the P2 pump 32. As mentioned above, the first remote control valve 21 and the third remote control valve 23 communicate the P1 pump 31 with the pilot lines 41, 43, and the second remote control valve 22 and the fourth remote control valve 24 communicate the P2 pump 32 with the pilot lines 42, 44. The pressure sensors 45 are each electrically connected with the controller 60, and send pressure signals corresponding to the measured pressure of the hydraulic oil flowing through the pilot lines 41, 42, 43, 44 to the controller 60.

The rotation sensor 65 is a sensor that measures the rotation speed of the traveling motor 33, and is attached to each of the left and right traveling motors 33. The rotation sensor 65 is electrically connected with the controller 60, and sends rotation speed signals corresponding to the measured rotation speeds of the traveling motors 33 to the controller 60.

The setting mechanism 70 is a device for setting the traveling speed of the construction machine 1 so that the construction machine 1 travels in creep mode, which is even slower than low speed. Specifically, the setting mechanism 70 sets an upper limit of the speed at which the construction machine 1 travels, and executes settings so that the construction machine 1 travels at a speed slower than the set upper limit speed. The setting signal set by the setting mechanism 70 is sent to the controller 60.

[Control Details]

<First Control Form>

Figure 3:
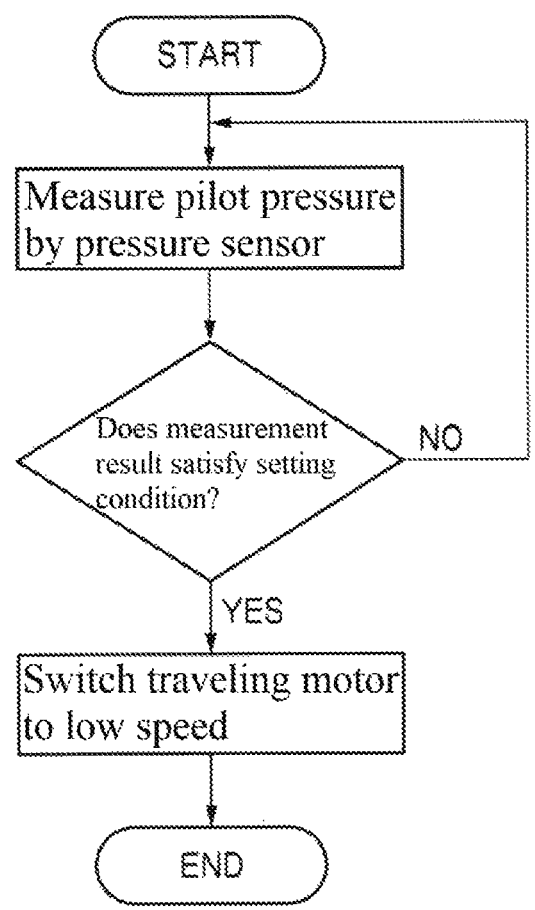
FIG. 3 is a flow chart simply illustrating a flow of a control form for automatically switching a speed of the construction machine from high speed to low speed.

A first control form is a form for adjusting the pressure of the hydraulic oil supplied from the remote control valves 21, 22, 23, 24, and automatically switching the speed of one or both of the left and right traveling mechanisms 8 from high speed to low speed. FIG. 3 is a flow chart simply illustrating a flow of the control form for automatically switching the speed of the construction machine 1 from high speed to low speed. As illustrated in FIG. 3, according to the first control form, the pressure sensors 45 measure the pressure of the hydraulic oil flowing through the pilot lines 41, 42, 43, 44, and the controller 60 judges whether or not the pressure of the hydraulic oil flowing through the pilot lines 41, 42, 43, 44 satisfies preset conditions. When the conditions are satisfied, the controller 60 controls the traveling mechanisms 8 so that the speed of one or both of the left and right traveling mechanisms 8 is automatically switched from high speed to low speed. As two representative control forms of the first control form, a spin turn and a pivot turn will be described.

(Spin Turn)

The spin turn is an operation that turns an orientation of the overall construction machine 1 on the spot by moving one of the left and right traveling mechanisms 8 forward and the other backward. The control when the spin turn is performed will be described in accordance with FIG. 3.

First, the pressure (pilot pressure) of the hydraulic oil flowing through the pilot lines 41, 42, 43, 44 when the remote control valves 21, 22, 23, 24 are operated by the operator is measured by the pressure sensors 45. It should be noted that the operation amount of the remote control valves 21, 22, 23, 24 corresponds to the measured value. That is, when the measured value is large, the operation amount of the remote control valves 21, 22, 23, 24 is large, and when the measured value is small, the operation amount of the remote control valves 21, 22, 23, 24 is small.

Next, the controller 60 judges whether or not one of the left and right traveling mechanisms 8 is moved forward and the other is moved backward in the operation of the operator on the basis of the pressure signals from the pressure sensors 45. When the controller 60 judges that one of the left and right traveling mechanisms 8 is moving forward and the other is moving backward, the controller 60 automatically switches the speed of both the left and right traveling mechanisms 8 from high speed to low speed, regardless of the operation amount of the remote control valves 21, 22, 23, 24 by the operator. As a result, a turning performance when the spin turn is performed is improved.

(Pivot Turn)

The pivot turn is an operation that turns the orientation of the overall construction machine 1 by moving one of the left and right traveling mechanisms 8 forward or backward and stopping the other. The control when the pivot turn is performed will be described in accordance with FIG. 3.

First, the pressure (pilot pressure) of the hydraulic oil flowing through the pilot lines 41, 42, 43, 44 when the remote control valves 21, 22, 23, 24 are operated by the operator is measured by the pressure sensors 45. Next, the controller 60 judges whether or not one of the left and right traveling mechanisms 8 is moving forward or backward in the operation of the operator, and the other is stopped on the basis of the pressure signal from the pressure sensors 45. When the controller 60 judges that one of the left and right traveling mechanisms 8 is moving forward or backward and the other is stopped, the controller 60 automatically switches from high speed to low speed by controlling the pressure of the hydraulic oil supplied from the remote control valves 21, 22, 23, 24 controlling the one traveling mechanism 8, regardless of the operation amount of the remote control valves 21, 22, 23, 24 by the operator. As a result, the turning performance when the pivot turn is performed is improved.

<Second Control Form>

Figure 4:
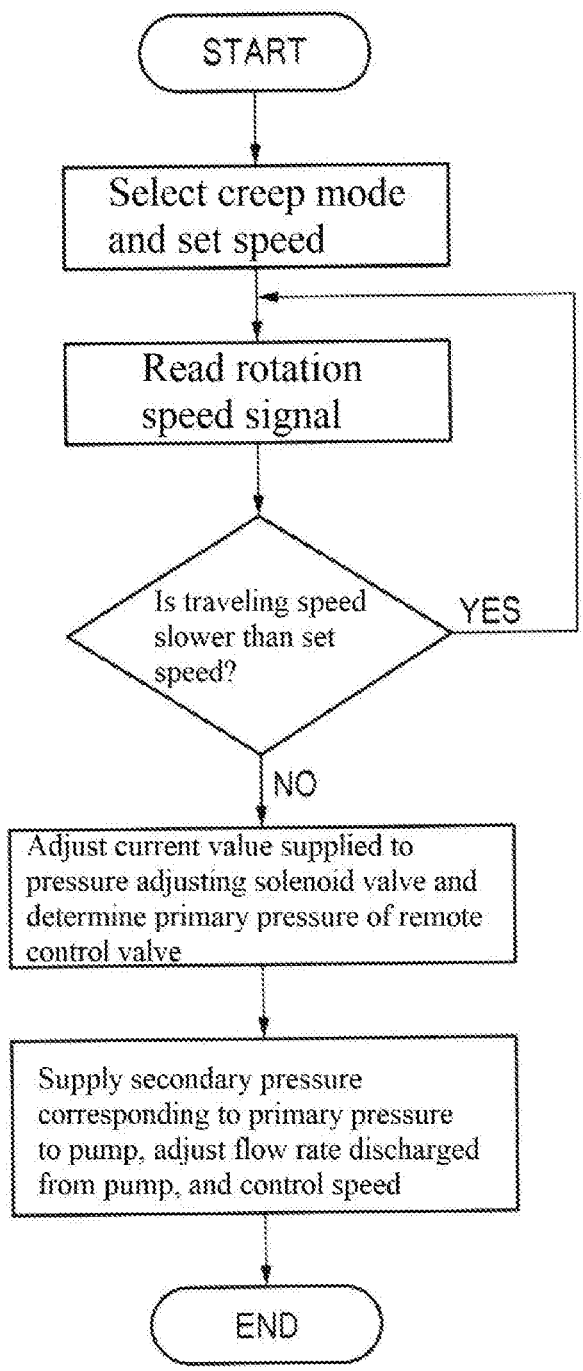
FIG. 4 is a flow chart simply illustrating a flow of a control form for making the construction machine travel at a speed less than or equal to a traveling speed set in creep mode.

A second control form is a form for controlling the traveling speed of the construction machine 1 so that the construction machine 1 travels in creep mode when ultra-low speed mode (hereinafter referred to as "creep mode") even slower than low speed mode is provided in addition to high speed mode and low speed mode as a traveling form of the construction machine 1. In the second control form, the setting mechanism 70 is used for setting the traveling speed of the construction machine 1 to ensure that the traveling speed of the construction machine 1 does not exceed a predetermined speed. Examples of the setting mechanism 70 include a display device, a dial mechanism, and the like. An overview of the flow of the control form for controlling the traveling speed of the construction machine 1 thus set by the setting mechanism 70 will be described in accordance with FIG. 4.

First, creep mode is selected and the traveling speed of the construction machine 1 is set by the setting mechanism 70. Further, the controller 60 reads the rotation speed signal from the rotation sensor 65, compares the traveling speed of the construction machine 1 calculated on the basis of the rotation speed signal and the set speed in creep mode set by the setting mechanism 70, and judges whether or not the traveling speed is slower than the set speed. When the controller 60 judges that the current traveling speed is faster than the set speed, the controller 60 sends a command corresponding to the set speed to the pressure adjusting solenoid valves 61, 62. That is, the current value corresponding to the set speed is supplied to the pressure adjusting solenoid valves 61, 62. The pressure adjusting solenoid valves 61, 62 determine the primary pressure of the hydraulic oil supplied to the remote control valves 21, 22, 23, 24 by the supply of the current value corresponding to the set speed. The remote control valves 21, 22, 23, 24 supply the secondary pressure of the hydraulic oil corresponding to the determined primary pressure to the P1 pump 31 and the P2 pump 32 via the pilot lines 41, 42, 43, 44 independently of the operation of the remote control valves 21, 22, 23, 24. The P1 pump 31 and the P2 pump 32 supply the hydraulic oil of the flow rate corresponding to the secondary pressure of the hydraulic oil to the traveling motor 33. The flow rate of the supplied hydraulic oil is a flow rate at which the traveling motor 33 rotates slower than the set traveling speed. The construction machine 1, by such control, is controlled so as to travel at a speed slower than the set speed.

<Third Control Form>

Figure 5:
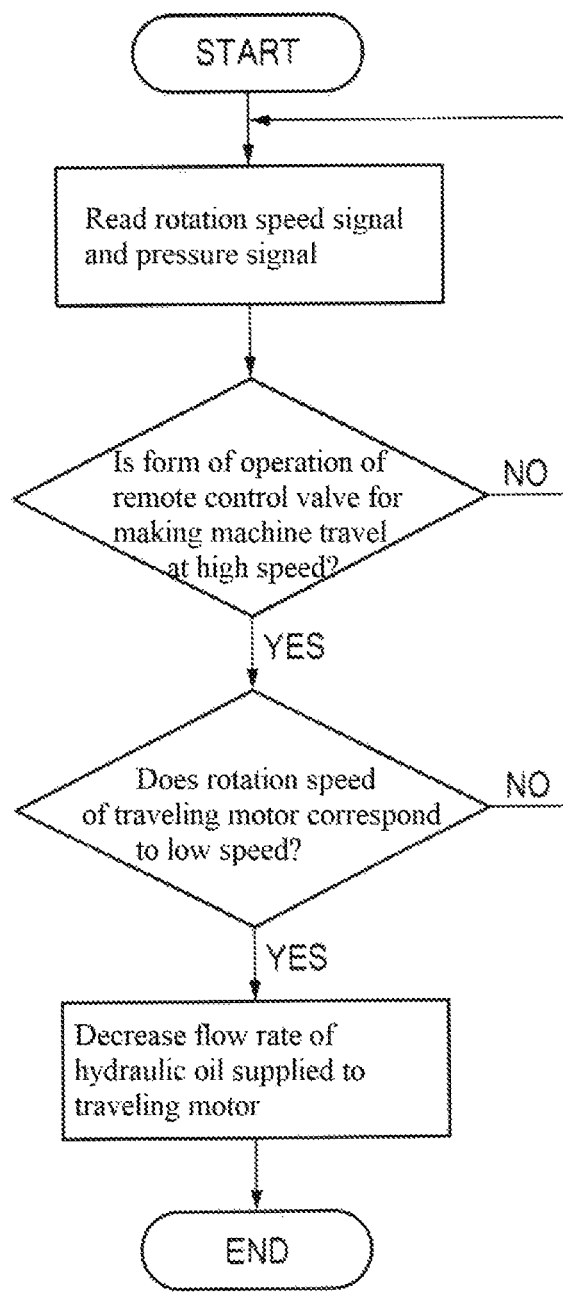
FIG. 5 is a flow chart simply illustrating a flow of a control form for switching the speed of the construction machine from high speed to low speed when a load increases.

When the construction machine 1 climbs uphill, for example, a load of the traveling mechanism 8 increases more than when traveling on flat ground. A third control form is a form for controlling the traveling mechanism 8 when the load of the traveling mechanism 8 increases. Whether or not the load of the traveling mechanism 8 increases is judged by measuring the rotation speed and an engine torque of the traveling motor 33. That is, when the rotation speed of the traveling motor 33 has decreased, it is judged that the load of the traveling mechanism 8 has increased. A case where the travel load increases will be described in accordance with FIG. 5.

First, the controller 60 reads the rotation speed signal from the rotation sensor 65, and the pressure signals from the pressure sensors 45. Further, in this process, the engine torque is also read. Next, on the basis of the pressure signals, the controller 60 judges the contents of the operation of the remote control valves 21, 22, 23, 24 operated by the operator. Specifically, the controller 60 judges whether the operation that makes the construction machine 1 travel at low speed or at high speed is performed. When it is judged that the operation that makes the construction machine 1 travel at high speed is performed, the controller 60 judges whether the construction machine 1 is traveling at high speed or at low speed on the basis of the rotation speed signal. Regardless if the operation that makes the construction machine 1 travel at high speed is performed, when the construction machine 1 is traveling at low speed, the controller 60 judges that the load of the traveling mechanism 8 is increasing.

When it is judged that the load is increasing, the flow rate of the hydraulic oil supplied to the traveling motor 33 is decreased. Specifically, the following control is executed. First, the controller 60 changes the current value supplied to the pressure adjusting solenoid valves 61, 62 and determines the primary pressure of the hydraulic oil supplied to the remote control valves 21, 22, 23, 24. As a result, the secondary pressure of the hydraulic oil supplied from the remote control valves 21, 22, 23, 24 is adjusted to a pressure corresponding to the primary pressure and the hydraulic oil is supplied to the pump. The pump is activated so that the flow rate of the hydraulic oil discharged from the pump is decreased in accordance with the secondary pressure, thereby switching the traveling speed of the construction machine 1 to low speed. With such control performed, the load applied to the traveling mechanism 8 is decreased.

Next, the control when changing from the form of climbing uphill to the form of traveling on flat ground will be described. When the construction machine 1 climbs uphill at low speed, the rotation speed of the traveling motor 33 is low, and the engine torque is large. On the other hand, when the construction machine 1 travels on flat ground at high speed, the rotation speed of the traveling motor 33 is high, and the engine torque is small. When the traveling form of the construction machine 1 is changed from the form of climbing uphill at low speed to the form of traveling on flat ground, the traveling form of the construction machine 1 is automatically switched from low speed to high speed. When, at this time, the construction machine 1 changes from the form of climbing to the form of traveling on flat ground, the rotation speed and the engine torque of the traveling motor 33 are measured, and the form is switched from low speed to high speed.

Figure 6:
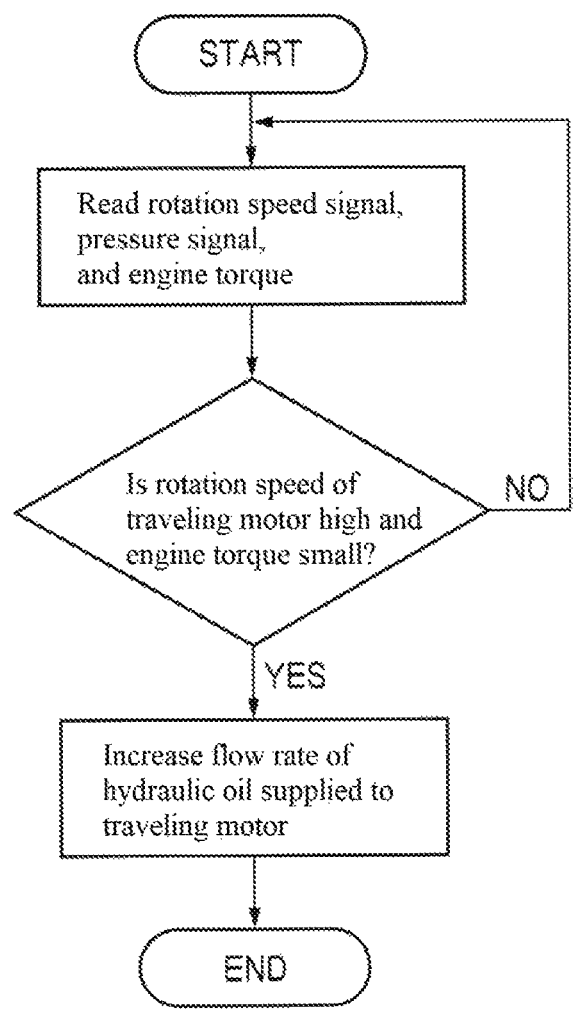
FIG. 6 is a flow chart simply illustrating a flow of a control form when changing from a form where a rotation speed of a traveling motor is low and an engine torque is large to a form where the rotation speed of the traveling motor is high and the engine torque is small.

First, as illustrated in FIG. 6, the controller 60 reads the rotation speed signal, the engine torque, and the pressure signals. Next, the controller 60 judges whether or not the rotation speed of the traveling motor 33 is high and the engine torque is small on the basis of the read signals. When the controller 60 judges that the rotation speed of the traveling motor 33 is high and the engine torque is small, the controller 60 changes the current value supplied to the pressure adjusting solenoid valves 61, 62. The pressure adjusting solenoid valves 61, 62 supply the primary pressure corresponding to the current value to the remote control valves 21, 22, 23, 24. The remote control valves 21, 22, 23, 24 supply the secondary pressure corresponding to the primary pressure to the pump. The pump is activated so that the flow rate of the hydraulic oil discharged from the pump is increased in accordance with the secondary pressure, thereby switching the traveling speed of the construction machine 1 to high speed. With such control performed, the traveling form of the construction machine 1 once changed to low speed is automatically switched to high speed.

(Automatic Transmission Mechanism)

In each of the control forms described above, the transmission function automatically switches to first gear when the speed gradually drops to about a speed of first gear during travel in second gear. Subsequently, when the load is reduced, the speed automatically returns to second gear. This return to second gear is controlled in accordance with an engine load factor.

On the other hand, as another transmission function, when operation of the remote control valves 21, 22, 23, 24 is set to full lever and a pressure signal from the pressure sensor 45 detects pressure equivalent to full lever, the speed switches to first gear when the traveling speed in second gear becomes less than or equal to a set value. Then, when the speed in first gear increases to a speed greater than or equal to a set value, the speed returns to second gear. The set value for switching from second gear to first gear can be set as desired (such as at most 35% of the speed of second gear, for example), and the set value for switching from first gear to second gear can also be set as desired (such as at least 60% of the speed of second gear, for example).

EXPLANATION OF REFERENCE NUMERALS

1 Construction machine
2 Main frame
3 Operator cabin
4 Work mechanism
6 Arm
7 Bucket
8 Traveling mechanism
9 Crawler
10 Track roller
11 Driving mechanism
12 Sprocket
13 Track roller
20 Remote control valve unit
21, 22, 23, 24 Remote control valves
21 First remote control valve
22 Second remote control valve
23 Third remote control valve
24 Fourth remote control valve
30 HST circuit
31, 32 Pumps
31 P1 pump
32 P2 pump
33 Traveling motor
41, 42, 43, 44 Pilot line
45 Pressure sensor
46 P3 line
47 P4 line
49 Primary pilot line
53 P3 pump
54 P4 pump
60 Controller
61, 62 Pressure adjusting solenoid valves
61 First pressure adjusting solenoid valve
62 Second pressure adjusting solenoid valve
65 Rotation sensor
70 Setting mechanism

The invention claimed is:

1. A traveling control mechanism that controls a traveling mechanism of a construction machine, the traveling mechanism comprising left and right sub-traveling mechanisms, the left and right sub-traveling mechanisms being driven by a hydro static transmission (HST) circuit, the traveling control mechanism comprising:

a remote control valve that controls an operation of the construction machine;

a pressure adjusting solenoid valve that adjusts a primary pressure of a hydraulic oil supplied to the remote control valve;

a setting mechanism for executing a fixed setting to make the construction machine perform a desired operation; and a controller for controlling the traveling mechanism, wherein:

the traveling mechanism is configured to switch a traveling speed of the construction machine between a high speed and a low speed slower than the high speed, in accordance with an operation amount of the remote control valve, the HST circuit comprises a pump and a traveling motor, the pump connects to pilot lines extending from the remote control valve and allows the hydraulic oil supplied from the remote control valve to flow therethrough, the pilot lines each comprise a pressure sensor that measures a secondary pressure of the hydraulic oil flowing through the pilot lines, the traveling motor comprises a rotation sensor that measures a rotation speed of the traveling motor, the controller activates the remote control valve independently of a manual operation thereof so as to adjust the secondary pressure of the hydraulic oil supplied from the remote control valve based on a setting signal from the setting mechanism, pressure signals from the pressure sensors, and a rotation speed signal from the rotation sensor, the remote control valve adjusts a flow rate of the hydraulic oil discharged from the pump by changing or keeping constant the secondary pressure of the hydraulic oil that flows through the pilot lines, the controller judges whether the remote control valve performed an operation for moving one of the left and right sub-traveling mechanisms forward or backward, or one of the left and right sub-traveling mechanisms forward and the other backward, based on the pressure signals from the pressure sensors, and is activated so as to change a current value supplied to the pressure adjusting solenoid valve, determine the primary pressure of the hydraulic oil supplied to the operated remote control valve, and adjust the secondary pressure of the hydraulic oil supplied from the remote control valve to a pressure corresponding to the primary pressure, and the pump is activated so that the flow rate of the hydraulic oil discharged from the pump is kept constant in accordance with the secondary pressure, thereby switching the traveling speed of one or both of the left and right sub-traveling mechanisms corresponding to the operated remote control valve from high speed to low speed.

2. The traveling control mechanism according to claim 1, wherein:
the setting mechanism is configured so that the traveling speed of the construction machine can be set to creep mode where the traveling speed of the construction machine is slower than the low speed,
the controller compares the traveling speed of the construction machine calculated based on of the rotation speed signal and a set speed in creep mode set by the setting mechanism and, when the traveling speed exceeds the set speed, is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and
the pump is activated so that the flow rate of the hydraulic oil discharged from the pump is kept constant in accordance with the secondary pressure, thereby making the construction machine travel at the set speed in creep mode set by the setting mechanism.

3. The traveling control mechanism according to claim 1, wherein:
regardless of whether an operation of the remote control valve is a form for making the construction machine travel at the high speed, when the controller judges that the construction machine is traveling at the low speed on the basis of the rotation speed signal,
the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and
the pump is activated so that the flow rate of the hydraulic oil discharged from the pump is decreased in accordance with the secondary pressure, thereby switching the traveling speed of the construction machine to the low speed.

4. The traveling control mechanism according to claim 1, wherein:
when changing from a form where the rotation speed of the traveling motor of the construction machine is low and an engine torque is large to a form where the rotation speed of the traveling motor is high and the engine torque is small,
the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and
the pump is activated so that the flow rate of the hydraulic oil discharged from the pump is increased in accordance with the secondary pressure, thereby automatically switching the traveling speed of the construction machine from the low speed to the high speed.

5. The traveling control mechanism according to claim 1, wherein:
when operation of the remote control valve is set to full lever and the pressure signals from the pressure sensors detect the secondary pressure equivalent to full lever, the traveling speed is automatically switched from the high speed to the low speed when the traveling speed is less than or equal to a set value, and from the low speed to the high speed when the traveling speed is greater than or equal to the set value.

6. The traveling control mechanism according to claim 1, wherein:
the setting mechanism is configured so that the traveling speed of the construction machine can be set to creep mode where the traveling speed of the construction machine is slower than the low speed,
the controller compares the traveling speed of the construction machine calculated based on of the rotation speed signal and a set speed in creep mode set by the setting mechanism and, when the traveling speed exceeds the set speed, is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure,
the pump is activated so that the flow rate of the hydraulic oil discharged from the pump is kept constant in accordance with the secondary pressure, thereby making the construction machine travel at the set speed in creep mode set by the setting mechanism,
regardless of whether an operation of the remote control valve is a form for making the construction machine travel at the high speed, when the controller judges that the construction machine is traveling at the low speed on the basis of the rotation speed signal,
the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and
the pump is activated so that the flow rate of the hydraulic oil discharged from the pump is decreased in accordance with the secondary pressure, thereby switching the traveling speed of the construction machine to the low speed.

7. The traveling control mechanism according to claim 6, wherein:
when changing from a form where the rotation speed of the traveling motor of the construction machine is low and an engine torque is large to a form where the rotation speed of the traveling motor is high and the engine torque is small,
the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and
the pump is activated so that the flow rate of the hydraulic oil discharged from the pump is increased in accordance with the secondary pressure, thereby automatically switching the traveling speed of the construction machine from the low speed to the high speed.

8. The traveling control mechanism according to claim 7, wherein:

when operation of the remote control valve is set to full lever and the pressure signals from the pressure sensors detect the secondary pressure equivalent to full lever, the traveling speed is automatically switched from the high speed to the low speed when the traveling speed is less than or equal to a set value, and from the low speed to the high speed when the traveling speed is greater than or equal to the set value.

9. A traveling control mechanism that controls a traveling mechanism of a construction machine, the traveling mechanism comprising left and right sub-traveling mechanisms, the left and right sub-traveling mechanisms being driven by a hydro static transmission (HST) circuit, the traveling control mechanism comprising:

a remote control valve that controls an operation of the construction machine;

a pressure adjusting solenoid valve that adjusts a primary pressure of a hydraulic oil supplied to the remote control valve;

a setting mechanism for executing a fixed setting to make the construction machine perform a desired operation; and a controller for controlling the traveling mechanism, wherein:

the traveling mechanism is configured to switch a traveling speed of the construction machine between a high speed and a low speed slower than the high speed, in accordance with an operation amount of the remote control valve, the HST circuit comprises a pump and a traveling motor, the pump connects to pilot lines extending from the remote control valve and allows the hydraulic oil supplied from the remote control valve to flow therethrough, the pilot lines each comprise a pressure sensor that measures a secondary pressure of the hydraulic oil flowing through the pilot lines, the traveling motor comprises a rotation sensor that measures a rotation speed of the traveling motor, the controller activates the remote control valve independently of a manual operation thereof so as to adjust the secondary pressure of the hydraulic oil supplied from the remote control valve based on a setting signal from the setting mechanism, pressure signals from the pressure sensors, and a rotation speed signal from the rotation sensor, the remote control valve adjusts a flow rate of the hydraulic oil discharged from the pump by changing or keeping constant the secondary pressure of the hydraulic oil that flows through the pilot lines, the setting mechanism is configured so that the traveling speed of the construction machine can be set to creep mode where the traveling speed of the construction machine is slower than the low speed, the controller compares a traveling speed of the construction machine calculated based on of the rotation speed signal and a set speed in creep mode set by the setting mechanism and, when the traveling speed exceeds the set speed, is activated so as to change a current value supplied to the pressure adjusting solenoid valve, determine the primary pressure of the hydraulic oil supplied to the remote control valve, and adjust the secondary pressure of the hydraulic oil supplied from the remote control valve to a pressure corresponding to the primary pressure, and the pump is activated so that the flow rate of the hydraulic oil discharged from the pump is kept constant in accordance with the secondary pressure, thereby making the construction machine travel at the set speed in creep mode set by the setting mechanism.

10. The traveling control mechanism according to claim 9, wherein:

regardless of whether an operation of the remote control valve is a form for making the construction machine travel at the high speed, when the controller judges that the construction machine is traveling at the low speed on the basis of the rotation speed signal, the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and the pump is activated so that the flow rate of the hydraulic oil discharged from the pump is decreased in accordance with the secondary pressure, thereby switching the traveling speed of the construction machine to the low speed.

11. The traveling control mechanism according to claim 10, wherein:

when changing from a form where the rotation speed of the traveling motor of the construction machine is low and an engine torque is large to a form where the rotation speed of the traveling motor is high and the engine torque is small, the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and the pump is activated so that the flow rate of the hydraulic oil discharged from the pump is increased in accordance with the secondary pressure, thereby automatically switching the traveling speed of the construction machine from the low speed to the high speed.

12. The traveling control mechanism according to claim 11, wherein:

when operation of the remote control valve is set to full lever and the pressure signals from the pressure sensors detect the secondary pressure equivalent to full lever, the traveling speed is automatically switched from the high speed to the low speed when the traveling speed is less than or equal to a set value, and from the low speed to the high speed when the traveling speed is greater than or equal to the set value.

13. A traveling control mechanism that controls a traveling mechanism of a construction machine, the traveling mechanism comprising left and right sub-traveling mechanisms, the left and right sub-traveling mechanisms being driven by a hydro static transmission (HST) circuit, the traveling control mechanism comprising:

a remote control valve that controls an operation of the construction machine;

a pressure adjusting solenoid valve that adjusts a primary pressure of a hydraulic oil supplied to the remote control valve;

a setting mechanism for executing a fixed setting to make the construction machine perform a desired operation; and a controller for controlling the traveling mechanism, wherein:

the traveling mechanism is configured to switch a traveling speed of the construction machine between a high speed and a low speed slower than the high speed, in accordance with an operation amount of the remote control valve, the HST circuit comprises a pump and a traveling motor, the pump connects to pilot lines extending from the remote control valve and allows the hydraulic oil supplied from the remote control valve to flow therethrough, the pilot lines each comprise a pressure sensor that measures a secondary pressure of the hydraulic oil flowing through the pilot lines, the traveling motor comprises a rotation sensor that measures a rotation speed of the traveling motor, the controller activates the remote control valve independently of a manual operation thereof so as to adjust the secondary pressure of the hydraulic oil supplied from the remote control valve based on a setting signal from the setting mechanism, pressure signals from the pressure sensors, and a rotation speed signal from the rotation sensor, the remote control valve adjusts a flow rate of the hydraulic oil discharged from the pump by changing or keeping constant the secondary pressure of the hydraulic oil that flows through the pilot lines, regardless of whether an operation of the remote control valve is a form for making the construction machine travel at the high speed, when the controller judges that the construction machine is traveling at the low speed on the basis of the rotation speed signal, the controller is activated so as to change a current value supplied to the pressure adjusting solenoid valve, determine the primary pressure of the hydraulic oil supplied to the remote control valve, and adjust the secondary pressure of the hydraulic oil supplied from the remote control valve to a pressure corresponding to the primary pressure, and the pump is activated so that the flow rate of the hydraulic oil discharged from the pump is decreased in accordance with the secondary pressure, thereby switching the traveling speed of the construction machine to the low speed.

14. The traveling control mechanism according to claim 13, wherein:

when changing from a form where the rotation speed of the traveling motor of the construction machine is low and an engine torque is large to a form where the rotation speed of the traveling motor is high and the engine torque is small, the controller is activated so as to change the current value supplied to the pressure adjusting solenoid valve, determine the primary pressure of the hydraulic oil supplied to the remote control valve, and adjust the secondary pressure of the hydraulic oil supplied from the remote control valve to the pressure corresponding to the primary pressure, and the pump is activated so that the flow rate of the hydraulic oil discharged from the pump is increased in accordance with the secondary pressure, thereby automatically switching the traveling speed of the construction machine from the low speed to the high speed.

15. The traveling control mechanism according to claim 14, wherein:

when operation of the remote control valve is set to full lever and the pressure signals from the pressure sensors detect the secondary pressure equivalent to full lever, the traveling speed is automatically switched from the high speed to the low speed when the traveling speed is less than or equal to a set value, and from the low speed to the high speed when the traveling speed is greater than or equal to the set value.

16. A traveling control mechanism that controls a traveling mechanism of a construction machine, the traveling mechanism comprising left and right sub-traveling mechanisms, the left and right sub-traveling mechanisms being driven by a hydro static transmission (HST) circuit, the traveling control mechanism comprising:

a remote control valve that controls an operation of the construction machine;

a pressure adjusting solenoid valve that adjusts a primary pressure of a hydraulic oil supplied to the remote control valve;

a setting mechanism for executing a fixed setting to make the construction machine perform a desired operation; and a controller for controlling the traveling mechanism, wherein:

the traveling mechanism is configured to switch a traveling speed of the construction machine between a high speed and a low speed slower than the high speed, in accordance with an operation amount of the remote control valve, the HST circuit comprises a pump and a traveling motor, the pump connects to pilot lines extending from the remote control valve and allows the hydraulic oil supplied from the remote control valve to flow therethrough, the pilot lines each comprise a pressure sensor that measures a secondary pressure of the hydraulic oil flowing through the pilot lines, the traveling motor comprises a rotation sensor that measures a rotation speed of the traveling motor, the controller activates the remote control valve independently of a manual operation thereof so as to adjust the secondary pressure of the hydraulic oil supplied from the remote control valve based on a setting signal from the setting mechanism, pressure signals from the pressure sensors, and a rotation speed signal from the rotation sensor, the remote control valve adjusts a flow rate of the hydraulic oil discharged from the pump by changing or keeping constant the secondary pressure of the hydraulic oil that flows through the pilot lines when changing from a form where the rotation speed of the traveling motor of the construction machine is low and an engine torque is large to a form where the rotation speed of the traveling motor is high and the engine torque is small, the controller is activated so as to change a current value supplied to the pressure adjusting solenoid valve, determine the primary pressure of the hydraulic oil supplied to the remote control valve, and adjust the secondary pressure of the hydraulic oil supplied from the remote control valve to a pressure corresponding to the primary pressure, and the pump is activated so that the flow rate of the hydraulic oil discharged from the pump is increased in accordance with the secondary pressure, thereby automatically switching the traveling speed of the construction machine from the low speed to the high speed.

17. The traveling control mechanism according to claim 16, wherein:
when operation of the remote control valve is set to full lever and the pressure signals from the pressure sensors detect the secondary pressure equivalent to full lever, the traveling speed is automatically switched from the high speed to the low speed when the traveling speed is less than or equal to a set value, and from the low speed to the high speed when the traveling speed is greater than or equal to the set value.

18. A traveling control mechanism that controls a traveling mechanism of a construction machine, the traveling mechanism comprising left and right sub-traveling mechanisms, the left and right sub-traveling mechanisms being driven by a hydro static transmission (HST) circuit, the traveling control mechanism comprising:
a remote control valve that controls an operation of the construction machine;
a pressure adjusting solenoid valve that adjusts a primary pressure of a hydraulic oil supplied to the remote control valve;
a setting mechanism for executing a fixed setting to make the construction machine perform a desired operation; and
a controller for controlling the traveling mechanism, wherein:
the traveling mechanism is configured to switch a traveling speed of the construction machine between a high speed and a low speed slower than the high speed, in accordance with an operation amount of the remote control valve,
the HST circuit comprises a pump and a traveling motor,
the pump connects to pilot lines extending from the remote control valve and allows the hydraulic oil supplied from the remote control valve to flow therethrough,
the pilot lines each comprise a pressure sensor that measures a secondary pressure of the hydraulic oil flowing through the pilot lines,
the traveling motor comprises a rotation sensor that measures a rotation speed of the traveling motor,
the controller activates the remote control valve independently of a manual operation thereof so as to adjust the secondary pressure of the hydraulic oil supplied from the remote control valve based on a setting signal from the setting mechanism, pressure signals from the pressure sensors, and a rotation speed signal from the rotation sensor,
the remote control valve adjusts a flow rate of the hydraulic oil discharged from the pump by changing or keeping constant the secondary pressure of the hydraulic oil that flows through the pilot lines, and
when operation of the remote control valve is set to full lever and the pressure signals from the pressure sensors detect the secondary pressure equivalent to full lever, the traveling speed is automatically switched from the high speed to the low speed when the traveling speed is less than or equal to a set value, and from the low speed to the high speed when the traveling speed is greater than or equal to the set value.

19. A traveling control method for controlling a traveling mechanism of a construction machine, the traveling mechanism comprising left and right sub-control mechanisms, the left and right sub-traveling mechanisms being driven by a hydro static transmission (HST), the traveling control method comprising the steps of:
providing a remote control valve that controls an operation of the construction machine, a pressure adjusting solenoid valve that adjusts a primary pressure of a hydraulic oil supplied to the remote control valve, a setting mechanism for executing a fixed setting to make the construction machine perform a desired operation, and a controller for controlling the traveling mechanism through a traveling control mechanism;
configuring the traveling mechanism to switch a traveling speed of the construction machine between a high speed and a low speed slower than the high speed, in accordance with an operation amount of the remote control valve;
providing a pump and a traveling motor to the HST circuit;
connecting pilot lines extending from the remote control valve and allowing the hydraulic oil supplied from the remote control valve to flow therethrough to the pump;
attaching to each of the pilot lines a pressure sensor that measures a secondary pressure of the hydraulic oil flowing through the pilot lines;
attaching to the traveling motor a rotation sensor that measures a rotation speed of the traveling motor;
activating the remote control valve independently of a manual operation of the remote control valve by the controller so as to adjust the secondary pressure of the hydraulic oil supplied from the remote control valve based on a setting signal from the setting mechanism, pressure signals from the pressure sensors, and a rotation speed signal from the rotation sensor;
adjusting a flow rate of the hydraulic oil discharged from the pump by the remote control valve by changing or keeping constant the secondary pressure of the hydraulic oil that flows through the pilot lines,
judging whether the remote control valve performed an operation for moving one of the left and right sub-traveling mechanisms forward or backward, or one of the left and right sub-traveling mechanisms forward and the other backward, based on the pressure signals from the pressure sensors, and is activated so as to change a current value supplied to the pressure adjusting solenoid valve, determine the primary pressure of the hydraulic oil supplied to the operated remote control valve, and adjust the secondary pressure of the hydraulic oil supplied from the remote control valve to a pressure corresponding to the primary pressure, and
activating the pump so that the flow rate of the hydraulic oil discharged from the pump is kept constant in accordance with the secondary pressure, thereby switching the traveling speed of one or both of the left and right sub-traveling mechanisms corresponding to the operated remote control valve from high speed to low speed.

* * * * *